United States Patent Office
3,482,447
Patented Dec. 9, 1969

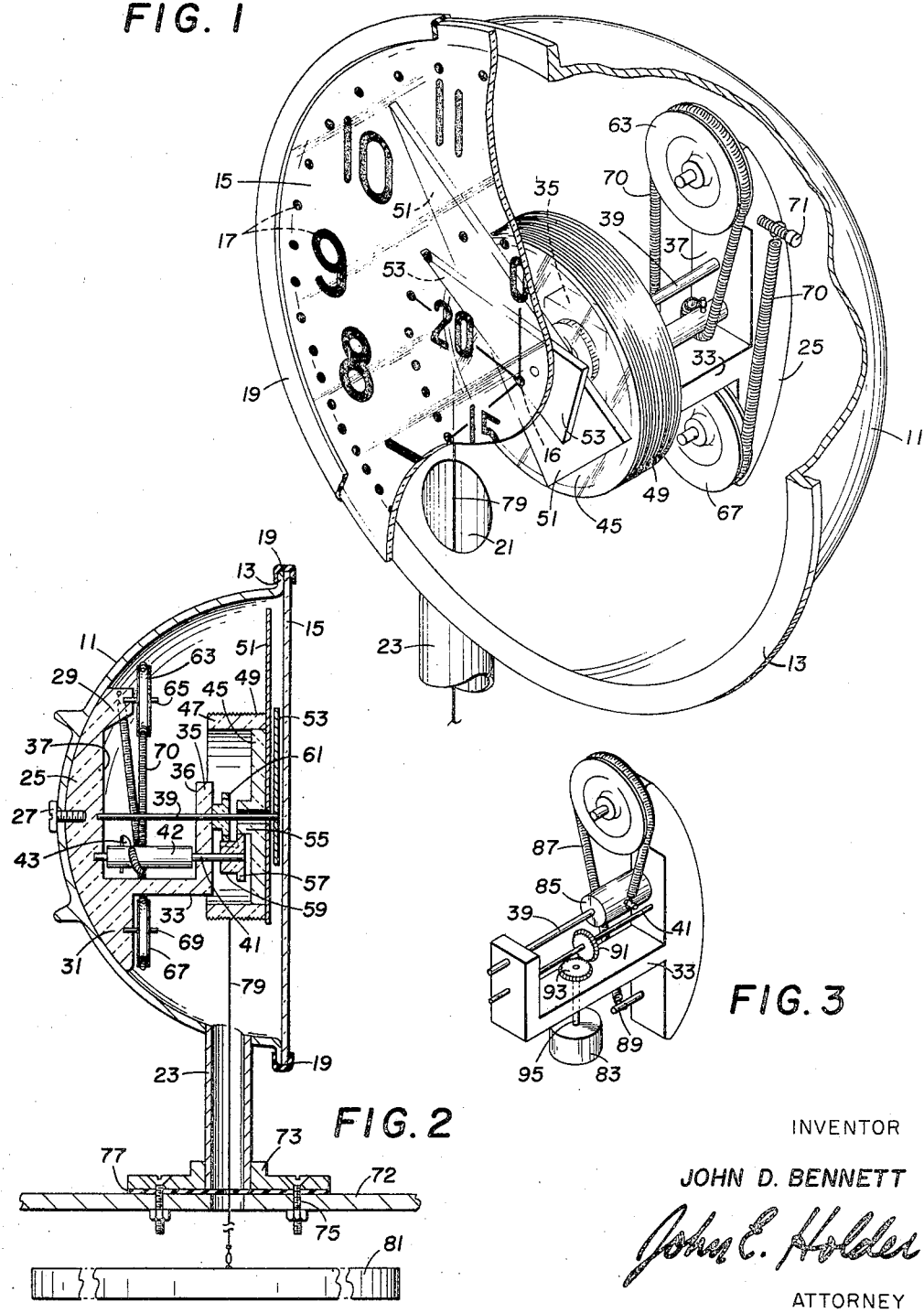

3,482,447
TANK LEVEL GAUGE
John D. Bennett, Richardson, Tex., assignor to Sun Oil Company, Philadelphia, Pa., a corporation of New Jersey
Filed Oct. 16, 1967, Ser. No. 675,526
Int. Cl. G01f 3/00
U.S. Cl. 73—321                                    7 Claims

ABSTRACT OF THE DISCLOSURE

An apparatus for measuring liquid level in a vessel utilizes a large float for contacting the surface of the liquid in the vessel. The float is attached to one end of a line which is attached at its opposite end to a measuring drum. The line is held taut by a relatively long spring having a low spring rate which acts on the drum. The measuring drum converts the linear motion of the line to rotative movement of indicators, which in turn cooperate with indicia on the face of the apparatus to provide a visual readout of the liquid level in the vessel. The individual indicia on the gauge face are conveniently removable to permit changes in the readout limits of the gauge.

BACKGROUND OF THE INVENTION

This invention relates to a gauge and more particularly to a gauge for determining the liquid level in a vessel and providing a visual readout. A great variety of devices have been used to determine and provide indications of the liquid level in tanks and other such vessels. However, under certain situations, as for example the gauging of liquid in an oil well stock tank, devices heretofore employed for such use have been found to have certain disadvantages. For example, the use of a sight gauge on an oil tank is not practical because the viscous fluids normally produced from petroleum reservoirs coat the interior of the glass and thereby prevent reading of the gauge from any appreciable distance. Other gauges permit the leakage of fluids from the tanks or do not provide an accurate readout, particularly one which is visible at a distance from the tank.

The normal routine followed in determining the liquid level of a petroleum stock tank without the benefit of some sort of liquid level gauge is as follows: A person usually performs this service on a great number of sometimes widely spaced well leases each of which is provided with a group of tanks. The gauger normally must drive to each tank group whereupon it is necessary for him to climb the side of each tank by means of a ladder provided thereon and to open a hatch on the upper surface of the tank. A steel tape is then lowered into the tank until its lower end reaches the bottom of the tank. The gauger observes the wet line on the tape to determine the liquid level, then wipes the steel tape clean as he rereels the tape before gauging the next tank. It is almost impossible to manually gauge the tank without breathing vapors from the open hatch. Oftentimes the fluids within the tank include gases which are dangerous when inhaled by the gauger.

Additionally it is impractical to mount many types of gauges on tanks already in service. For example, a liquid level sight gauge requires openings to be drilled at the top and bottom side wall of the tank to permit its installation. Such an installation requires emptying of the tank and even then may be undesirable in that such openings can cause the tank to subsequently leak. Also, a gauge mounted on the side of a tank may not be conveniently viewable from a distance. For these and other reasons, it is desirable to locate the gauge on the upper surface of the tank.

It is therefore an object of the present invention to provide a new and improved liquid level gauge having a low construction cost and being conveniently readable by a person from a distance.

SUMMARY OF THE INVENTION

With these and other objects in view, the present invention contemplates a liquid level gauge having a lightweight float member with a large surface area for contacting the surface of liquid in a vessel. A line connects the float member with a measuring drum rotatably mounted within a gauge housing which in turn is mounted on top of the vessel to be gauged. Means are provided on the measuring drum to level wind the line on the drum, with the pitch circumference of the line about the drum being an increment of the indicia on the measuring apparatus. The measuring drum is connected to a measuring mechanism including a transmission for driving one or more indicators representing movement of the drum. The rotational movement of the measuring drum, which follows movement of the float and line, is impeded by the force of a spring having one end attached to the measuring mechanism and the other end anchored to the gauge housing. The spring or similar resilient member has a low spring rate and is a relatively long member. A face plate having indicia thereon is provided over an open side of the gauge housing. Indicators driven by the measuring mechanism cooperate with the indicia to provide a visual readout of the measurement. The indicia on the face is conveniently removable in order to permit changing of the indicated limits of measurement on the gauge face.

A complete understanding of this invention may be had by reference to the following detailed description when read in conjunction with the accompanying drawings illustrating embodiments of the invention.

BRIEF DESCRIPTION OF THE DRAWINGS

FIGURE 1 is a perspective view of a gauge embodying the principles of the invention and showing the indicia bearing face plate on the gauge;

FIGURE 2 shows a cross sectional side elevation view of the gauge mounted on the upper surface of a vessel and the float member positioned in the vessel; and FIGURE 3 shows an alternative arrangement of the gauge mechanism.

DESCRIPTION OF THE PREFERRED EMBODIMENTS

Referring first to FIGURE 1, a gauge housing is shown shaped in the form of a bowl with a flanged edge forming a lip 13 about the periphery of an open face in the housing. The housing is preferrably made from molded plastic to provide a low construction cost and a housing which will be resistant to the corrosive effects of petroleum reservoir fluids. A transparent face plate 15, made of glass or a clear plastic material is mounted over the open face with the face plate having a plurality of indicia 17 placed thereon. A rubber or elastic sealing ring member 19 is placed over the outer edge of face plate 15 and lip 13 of the housing to maintain the transparent face in contact with the lip about the open side of the housing and thereby provide a fluid tight configuration for the housing. A clamp or the like (not shown) may be positioned over the sealing ring member 19 to insure a tighter seal between the face plate and housing under high pressure conditions. An opening 21 in the lower wall of the housing communicates the housing interior with a tubular member 23 extending downwardly therefrom at a position offset from the centerline of the housing. The tubular member is attached to the housing by glue or in some other manner fused to the housing to provide a fluid tight seal therebetween. A mounting member 25 is secured to the rear wall of the interior of the housing by means of a screw 27. The mounting member is preferably made of plastic or other such corrosion resistant material. The mounting member provides a means for mounting a motion converting mechanism in the housing.

Referring next to FIGURE 2, the mounting member 25 has upper and lower enlarged portions 29, 31 respectively extending outwardly from the mounting member. An "L" shaped leg 33 protrudes outwardly and upwardly from the lower enlarged portion 31 of the mounting member. The upwardly extending portion 35 of the leg 33 provides a surface 36 parallel to the outwardly facing longitudinal surface 37 of the mounting member. The motion converting mechanism includes a centrally mounted stainless steel shaft 39 shown extending outwardly from the surface 37 of the mounting member 25 and through an opening in the upwardly extending portion 35 of the "L" shaped member 33. The central shaft 39 is arranged so that its longitudinal axis is aligned with the center of the open face of the housing.

A second stainless steel shaft 41, which is parallel to and offset from shaft 39 also projects outwardly from the mounting member 25 and passes through the upwardly extending portion 35 of the L-shaped leg 33. A nylon sleeve 42 is placed about the offset shaft 41 and is fixedly held on the shaft by means of a pin 43 which passes through the sleeve and shaft. The sleeve 42 provides an enlarged diameter surface on the shaft for reason to be hereinafter described. The sleeve 42 also maintains the shaft in position in the mounting member 25. A plastic measuring drum or wheel 45 is rotatably mounted on the central shaft 39 between the upwardly extending leg 35 and the face plate 15. The measuring drum 45 has an outer flanged portion 47 which is provided with threads 49 about its outer peripheral surface. A long plastic pointer 51 is attached to the measuring drum 45 and rotates with the measuring drum. A second shorter plastic pointer 53 is attached to the end of shaft 39 and rotates with the shaft.

A pinion gear 55 is formed on the inwardly facing surface of the measuring drum and has a bore portion common with a bore portion in the measuring drum which in turn is sized to rotatably fit about the central shaft 39 to permit relative rotational movement therebetween. The pinion gear 55 has peripheral teeth (not shown) which mesh with peripheral teeth (not shown) on a first large gear 57 which in turn is attached to the outer end of the offset shaft 41. The gears 55, 57 thus form a first gear reduction means. A second pinion gear 59 is formed integrally with large gear 57. The second pinion gear 59 has peripheral teeth (not shown) which are meshed with a second large gear 61 mounted on and pinned to the central shaft 39. The gears 59, 61 thus form a second gear reduction means.

An upper plastic idler pulley 63 is rotatably mounted on a stainless steel shaft 65 extending from the upper enlarged portion 29 of the mounting member 25. A lower plastic idler pulley 67 is rotatably mounted on a stainless steel shaft 69 extending from the lower enlarged portion 30 of the mounting member. The shafts 65, 69, about which the idler pulleys are mounted, are positioned parallel with the central and offset shafts 39, 41 respectively of the gauge mechanism.

As shown in FIGURE 1 a stainless steel pin 71 extends outwardly from the side of the mounting member 25. A relatively long tension spring member 70 having a low spring rate is attached at one end to the pin 71 with the spring passing downwardly about the lower idler pulley 67, then upwardly over the upper idler pulley 63 and again downwardly into attachment with the pin 43 in sleeve 42 and offset shaft 41. Spring rate is defined as the ratio of load to deflection. Therefore, a spring having a low spring rate is a soft spring. The spring may be close wound from .016 inch diameter 303 stainless steel wire and then stress relieved at 600° F. A spring of this type which is approximately thirteen inches long has been found to be satisfactory for the arrangement shown in FIGURES 1 and 2.

Referring again to FIGURE 2, the gauge housing 11 is attached by means of the downwardly extending tubular member 23 to an iron mounting flange 73 which in turn is adapted for attachment to the top 72 of a tank. The tubular member 23 is attached to an interior bore of the flange 73 by means of glue, epoxy or the like to provide a fluid tight seal. Mounting flange 73 has mounting holes for attachment to the tank by means of bolts or screws 75. A gasket 77 is placed between the upper surface of the tank and the bottom of the mounting flange to provide a seal therebetween.

A gauge line 79 is made of string, wire or the like and preferably of some material which is not subject to deterioration when contacted by the product being stored in the tank. The line 79 is attached at its upper end to the measuring drum 45 and is adapted to be wrapped about the threads 49 thereon to provide a level wind of the line on the measuring drum and thereby prevent overlapping of the line. The threads or grooves 49 are formed in the measuring drum so that the pitch circumference of the line when it is wrapped about the drum is equal to the largest increment of measurement of the device which in this instance is the measured increment to be indicated by the pointer 51 mounted on the drum. The opposite end of the line 79, which extends downwardly through the housing and tubular member 23 into the tank, is attached to a large float 81 adapted to engage the surface of the liquid in the tank.

The float member is made of lightweight material such as a Styrofoam plastic and again preferably of some material which will be compatible with the liquid in the tank to prevent deterioration of the float. The extremely light weight of the float permits it to rest on the surface of the liquid thereby displacing very little liquid. As a result, if the upward force generated by the spring is varied, such variation will have little effect on the position of the bottom of the float relative to the surface of the liquid i.e., its displacement in the liquid will be substantially unchanged. The float must be sized and shaped to provide a substantial amount of surface tension between its lower surface and the surface of the liquid in the tank. A float approximately 12 inches in diameter has been found to provide the necessary surface tension in the embodiment of the gauge described herein. Such surface tension, together with the weight of the float, prevents the float from being lifted from the surface of the liquid by the force of the spring in the gauge acting through the gear mechanism on the measuring drum. The weight of the float should, however, be heavy enough to follow the liquid level should the surface tension be broken by waves or turbulence in the tank. In addition, the force of the spring must be sufficiently great to maintain the measuring line taut so that the line will be substantially perpendicular to the upper surface of the liquid in the tank. For the above reasons, it is important that the spring or other force generating means used in the gauging mechanism have a substantially constant force rate.

One method for providing a constant force of the spring acting on the sleeve 42 would be to taper the sleeve so that the moment arm of the sleeve would decrease as the spring is wound thereon, the shortened spring exerting a greater force which is offset by a smaller moment arm between the spring and shaft 41. However, this method complicates the construction of the apparatus and thereby increases the manufacturing costs. The same results may be accomplished by decreasing the spring length as little as possible so that a very small portion of the spring is used or taken up by the normal movement of the gauging mechanism. This produces only a small increase in force applied upwardly to the float line. The relatively large amount of surface tension between the liquid and float produces a force acting in an opposite direction on the line which is sufficient to overcome such a small increase in force caused by winding of the spring. It is for this reason that a relatively long spring has been used as provided by the idler pulleys about which the spring is wrapped so that in the normal use of the gauging mechanism only a relatively small portion of the spring is wound about the enlarged portion of the offset shaft. Additionally, the effective radius of the shaft is enlarged by the use of sleeve 42 to produce an increased torque on the shaft 41 so that a relatively weak spring may be used in the gauge. Such a weak spring permits the use of nylon or plastic gears and the use of other such materials in the construction of the mechanism which otherwise could not be used under greater force conditions.

Referring now to FIGURE 3 of the drawings, an alternative embodiment of the measuring mechanism is shown with provisions for mounting a potentiometer or the like 83 beneath the L-shaped portion of the mounting member. The potentiometer provides means for remotely indicating the gauge reading. In this embodiment a spring take up sleeve 85 is attached to the central shaft 39 which in the scheme of the gearing mechanism shown in FIGURE 2 rotates a less number of times per distance of travel of the float than the offset parallel shaft 41. Therefore, it is not necessary to have as long a spring since less length of the spring is wound about the sleeve 85 thereby causing less change in the spring rate during the normal operation of the gauge. The spring 87 is again attached at one end to the mounting member by means of a stainless steel pin 89, then passes over the upper idler pulley 63. The opposite end of the spring is attached by means of a pin to sleeve 85. A bevel gear 91 is mounted on the parallel offset shaft 41 and engages a bevel gear 93 mounted on a shaft 95 which extends through the L-shaped portion 33 of the mounting member perpendicular to shaft 41. The potentiometer 83 is coupled to the lower end of the shaft 95 to provide a means for detecting the rotational movement of shaft 41, and converting this information into an electrical signal which may be transmitted over a distance to a remote readout station.

In the operation of the apparatus described above the float 81 is placed in contact with the surface of the liquid in the tank 72. The force of the spring 70 acting through the gearing mechanism of the gauge is sufficient to maintain the line 79, which is connected between the measuring drum 45 and the float 81, in a taut condition so that the line 79 represents as near as possible a straight and perpendicular line between the measuring drum and the surface of liquid in the tank. As the liquid level in the tank changes, the float, of course, follows the movement or change in the liquid level. If the liquid level of the tank moves downwardly, the float weight and surface tension between the large surface area of the float 81 and the liquid in the tank are sufficient when acting through the gearing mechanism of the gauge to overbalance the force of spring 70 to cause rotation of the measuring drum 45. Rotation of the measuring drum, of course, causes the indicator 51 attached thereto to rotate and thereby change its relative position with respect to indicia on the face plate of the gauge. Likewise the indicator 53 which is attached to shaft 39 is rotated through the gearing mechanism at a lower ratio to provide changes in a fractional increment of the increment indicated by the pointer 51. Because the length of the spring 70 is relatively long with respect to the amount of the spring which is taken up on sleeve 42 by rotation of shaft 41 within the limits of the gauge mechanism, such spring maintains a substantially constant force on the line 79. Any unbalance caused by an increased upward force on the line is more than offset by the surface tension between the float 81 and liquid in the tank.

Because of the simplicity of the design and therefore low construction cost of the gauge heretofore described, it is possible in the oil industry, for example, to provide a gauge of this type for each product tank on a lease. Additionally, because of the readability provided by the relative size of the gauge, it is possible for the gauger to read the gauge from an automobile passing by the tank battery. However, the capacity of the tanks to be gauged in an oil field will vary and therefore, provisions have been made to change the limits of the indicia on the face plate 15. The reason for this is that the gauger who will be reading the gauge from a distance must be able to view a relative position of the pointer with respect to the limit of indicia on the face of the gauge. For example, if the tank were twenty-five feet high, a gauge having a face plate as shown in FIGURE 1 of the drawings would show sufficient increments clockwise between the number 20 and 0 to indicate up to the value of twenty-five feet. On the other hand, if the gauge were mounted on a twenty foot tank it would provide easier reading if the dots clockwise between 20 and 0 were removed thereby indicating that the upper limit of the tank is twenty feet. For this reason the dots and numbers on the face plate have been applied by using paint in a silk screen process so that the numbers may be readily removed by simply scraping the numbers from the smooth surface of the plate. It is noted that a center dot 16 is placed on the face plate to permit alignment between the dot 16 and the center of shaft 39 which in turn provides a means for aligning the face plate 15 with the front of the gauge.

While particular embodiments of the present invention have been shown and described, it is apparent that changes and modifications may be made without departing from this invention in its broader aspects.

What is claimed is:

1. In an apparatus for measuring the level of liquid in an oil well stock tank, a housing adapted for mounting on the tank; an indicator mounted on said housing; a motion converting mechanism in said housing for converting linear motion to rotary motion; a float member adapted for being positioned on the liquid surface and free to move about the liquid surface of the tank, said float member being constructed of an extremely lightweight material so as to displace a minimum amount of liquid; a line connecting said float member with said motion converting mechanism, said motion converting mechanism having means for applying a variable upward force to said line and means for converting the linear motion of said line into a rotary motion applied to said indicator, said float member having a large diameter flat bottom surface area for contacting the surface of the liquid in the tank to provide sufficient surface tension between the float and liquid to compensate for variations in the upward force on said line and thereby maintain said float in contact with the liquid surface, said motion converting mechanism including a shaft, and upward force applying means being a long spring member secured to said shaft and applying a reactive force thereto as said shaft rotates, said spring means having a relatively low spring rate and its length being such relative to the size and the amount of rotation of said shaft that no more than a small fraction of its length is taken up on said shaft so that in operation the spring rate of said spring means is preserved at a low value.

2. Apparatus for gauging the liquid level in a storage tank comprising, a housing having an interior portion with an open side; support means mounted in the interior portion of said housing; a first shaft rotatably supported by said support means and centrally positioned in said housing transverse to the open side of said housing; a second shaft on said support means parallel to and spaced from said first shaft; a pulley rotatably mounted on said support means; a long spring passing over said pulley and having a relatively low spring rate, said spring being anchored at one end relative to said housing and attached at its opposite end to said second shaft for winding on said shaft and applying a reactive force thereto; the length of said spring being such relative to the size and the amount of rotation of said second shaft that no more than a small fraction of its length is taken up on said second shaft to that in operation the spring rate of said spring is preserved at a low value; a measuring drum mounted about said first shaft; means for transmitting rotative movement of said drum to said second shaft; means responsive to the liquid level in said tank for turning said drum; a face for mounting on said open side of said housing and having measuring indicia thereon; indicator means driven by the rotation of said drum and registerable with said indicia on said face for providing an indication of the liquid level in said tank.

3. The apparatus of claim 2 wherein at least a portion of said face is transparent and further including a mark on said face for alignment with said first shaft to facilitate assembly of said face on said open side of said housing.

4. The apparatus of claim 2 wherein said indicia on said face is conveniently removable to provide means for changing the limits of measuring indicated on said face.

5. An apparatus for measuring the liquid level in a tank comprising, a housing of unitary construction and having an open side; a tubular member attached to the underside of said housing, said tubular member being positioned in a plane parallel to the open side of said housing; a mounting base at the lower end of said tubular member and having an opening axially aligned with the bore of said tubular member; a mounting member positioned in the interior of said housing and having an L-shaped portion extending outwardly from said mounting member to form a recesed portion between the mounting member and an upright leg of said L-shaped portion; first and second shafts centrally positioned parallel to one another within said housing and extending transversely to the open side of said housing, said shafts being rotatably supported by said mounting member and the upright leg of said L-shaped portion; a threaded drum rotatably mounted on said first shaft; a line wound on said drum and positioned in the grooves forming threads on said drum, one end of said line being secured to said drum and the other end extending through said tubular member and base into the tank; float means attached to the other end of said line, the pitch circumference of said line about said threaded drum being equal to an increment of measurement of said apparatus; first gear reduction means between said drum and said second shaft; second gear reduction means between said second shaft and said first shaft; a long spring having a low spring rate, said spring being connected at one end to said second shaft and windable about said second shaft and immovably anchored at its other end with respect to said housing; third and fourth shafts positioned in said housing parallel to and on opposite sides of said first shaft; pulleys mounted on said third and fourth shafts, said long spring being passed over each of said pulleys between its ends; a face having measuring indicia thereon and mounted over said open side in said housing; and first and second indicator means mounted on said drum and first shaft respectively for registering with said indicia.

6. The apparatus of claim 5 wherein said face is transparent and further including a mark in the center of said face for alignment with said first shaft to facilitate mounting of said face on said housing; and means forming a fluid tight seal between said face and housing.

7. The apparatus of claim 5 wherein said float member attached to said line has a large diameter for providing sufficient surface tension between said float and the liquid surface in the tank to belance the force applied to said line by said resilient means and gear reduction means, said float member being very lightweight to displace a minimum amount of liquid in said tank.

References Cited
UNITED STATES PATENTS

| | | | |
|---|---|---|---|
| 495,523 | 4/1893 | Seinecke | 73—321 |
| 954,550 | 4/1910 | Verhoeven | 73—321 |
| 1,171,632 | 2/1916 | Nuesell | 73—321 |
| 1,464,476 | 8/1923 | Kenyon | 73—321 |
| 1,813,244 | 7/1931 | Lawson | 73—321 |
| 2,158,936 | 5/1939 | Hennings | 73—321 |
| 2,629,261 | 2/1853 | McKinney | 73—321 |
| 3,099,158 | 7/1963 | Barker | 73—321 |
| 3,148,542 | 9/1964 | Clift | 73—321 |

LOUIS R. PRINCE, Primary Examiner

DANIEL M. YASICH, Assistant Examiner